Nov. 7, 1950
E. E. HARPER
2,529,252
PRESSURE ACTUATED CONTROL MECHANISM
Filed Jan. 8, 1945
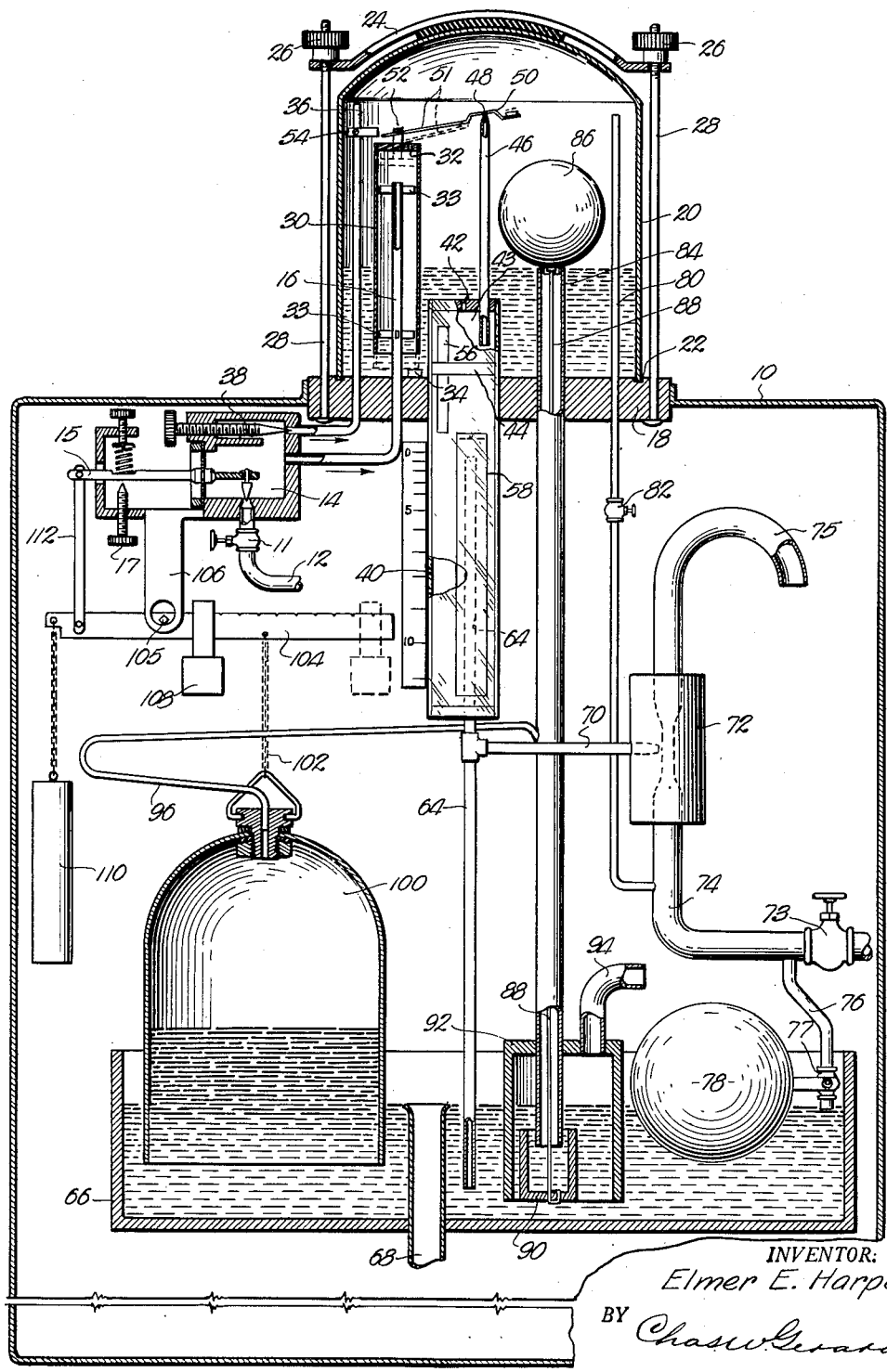
INVENTOR:
Elmer E. Harper,
BY Chas W Gerard
ATTORNEY.

Patented Nov. 7, 1950

2,529,252

UNITED STATES PATENT OFFICE 2,529,252

PRESSURE ACTUATED CONTROL MECHANISM

Elmer E. Harper, Monrovia, Calif.; Esther Pardee Harper executrix of Elmer E. Harper, deceased Application January 8, 1945, Serial No. 571,879

3 Claims. (Cl. 210—28)

The present invention relates to improvements in control mechanism, adapted for the regulation or control of the operation of other regulating means such as valves and the like.

A primary object of the improvements is to provide an accurate and sensitive type of control means in which the control function or operation is made responsive to fluctuations in pressure arising at the point of regulation or control, with a view to maintaining a substantially uniform operation of the means or mechanism subject to the control action.

One of the applications for which the improvements are specially designed is for the regulation or control of the flow of chlorine gas in feeding the same for the chlorination of water in water purification systems.

One type of construction for this purpose comprises a regulating chamber in communication with vacuum producing means, together with means responsive to changes in pressure for regulating the degree of vacuum allowed to be developed in said chamber. For accomplishing such purpose, the invention comprises a type of regulating chamber having both gas intake and outlet connections, and provided with a control for the outlet which is regulated in response to the operation of a differential pressure device located and operatively mounted in said chamber.

The invention further comprises a regulating chamber and means of the type indicated, in which both the intake and the outlet from the chamber are automatically controlled and regulated in response to pressure changes occurring in the chamber.

Specific features of the proposed improvements relate to the character of the differential-pressure actuating means whereby the aforesaid control and regulating functions are accomplished.

With the foregoing general objects in view, as well as various other and minor objects or purposes which will appear in the course of the detailed specification, the invention will now be described by reference to the accompanying drawing illustrating one type of apparatus designed for practical operation in accordance with the principles of the aforesaid improvements, after which those features and combinations comprising my invention will be particularly set forth and claimed.

In the drawing, the view shown represents a schematic elevation illustrating a form of gas or chemical feeding apparatus suitable for exemplifying the construction and the operations or functions of the present invention, the gas inlet and outlet connections being illustrated as broken away within the cabinet shown as forming a part of said apparatus.

Referring now to the said drawing in detail, the form of control apparatus and mechanism therein illustrated is in general the same as that shown and described in my copending application Serial No. 571,878, filed January 8, 1945, where the use of the mechanism is exemplified as a means for the control and regulation of a gas feeding system requiring the feeding of such gas by volume at a uniform rate.

As shown by the accompanying drawing, this construction is illustrated as comprising a suitable cabinet 10 provided with a gas supply and intake regulating means consisting of a supply pipe connection 12 equipped with a hand valve 11 and also with an automatic regulating valve 14 from which the gas flow is by way of a pipe or tube 16 to the interior of a bell jar 20; this jar is seated in tight-fitting relation in a groove 22 formed in the upper face of a base block 18 at the top of said cabinet 10, and secured to said block by a suitable yoke 24, nuts 26 and anchoring rods 28 as shown.

The upper end of the gas inlet tube 16 is enclosed by what I term an orifice bell member 30 having a gas orifice 32 at its upper end, and guide elements 33, projecting from the tube 16, serve to guide the bell member 30 when actuated vertically under the influence of differential gas pressure as hereinafter explained. Normally the bell member 30 rests on a spacer block 34, whereby its lower open end is maintained in liquid communication with the interior of the bell jar 20.

A bypass gas inlet tube 36 is also shown as extending from the valve 14 up through the base block 18 and terminating near the upper interior of the bell jar 20, the inlet end of said bypass tube 36 being provided with a suitable valve 38.

Mounted in projecting relation both above and below the block 18 is a transparent tube 40, which is closed at both ends with the exception of a water leak orifice 42 at its upper end which is adapted to feed water to a bubble compartment 43 formed above a partition block 44 in the upper end portion of the tube 40, or at approximately the level of the bottom of the bell jar 20. A gas flow tube 46 is mounted in the upper end of the tube 40, with its lower end adjacent to the bottom of the compartment 43, while its upper end projects well above the upper end of the tube 16 and terminates in a thin-edged valve seat defining a gas outlet orifice 48 which is controlled by a rocker type of valve member 50 in all essential respects similar to that illustrated in my copending application Ser. No. 539,049, filed June 7, 1944, now Patent No. 2,459,700 dated January 18, 1949. This valve is shown as provided with an operating arm 51 projecting over the orifice bell member 30, the upper end of which carries an angular projection or loop element 52 adapted for actuating engagement with said arm 51; and moreover, a stop element 54 is shown as adjustably mounted upon the upper end portion of the bypass gas tube 36 in position for engaging and limiting the upward movement of said bell member.

A tube 56 also provides a medium for the gas flow from the upper portion of the bubble compartment 43 to the space within the tube 40 which is below the partition 44, where a flow-metering manometer structure is provided in the lower portion of said tube 40.

This manometer structure comprises a gas manometer tube 58 of the character indicated in my copending application above referred to and having its lower end maintained in liquid communication with the interior of the tube 40, and also encloses the upper portion of a combination gas and water outlet tube 64 which extends down to a point adjacent the bottom of a constant level float box 66 having the overflow outlet 68. Below the tube 40 the pipe 64 is connected by a pipe 70 with a water-jet type of eductor device 72 having a water supply connection 74 and also a discharge outlet 75 for the outgoing gas and water mixture. The water supply pipe is provided with a branch connection 76 controlled by a valve 77 and float element 78 for supplying water to the float box 66, and also a branch pipe 80 communicating with the upper interior of the bell jar 20 and provided also with a regulating valve element 82, as shown. In this connection it may be stated that one purpose of using the said eductor device is to develop a partial vacuum or negative pressure condition in the carrying out of the control operation, as a safeguard against any leak in the system, which would result only in drawing in air to be mixed with the chlorine gas; that is to say, any leak in in the system would be inward rather than outward. While this might involve some reduction in the feeding rate of the gas pending repair of the leak, such result would be preferable to an objectionable escape of the chlorine gas due to reliance on a feeding pressure as maintained at the source of said gas supply.

Extending through the base 18 of the bell jar 20 is a combination vent and overflow pipe 84 projecting some distance above the upper end of the tube 40, while the lower end of the pipe 84 extends below the normal water level in the float box 66. A safety float ball 86 is mounted on the upper end of the pipe 84 and provided with a connecting wire 88 or the like supporting a vacuum breaker cup 90 which encloses the lower end of the pipe 84; and this pipe 84 also carries a vent bell 92 which in turn encloses said cup 90 and is provided with a safety vent outlet 94.

From the combination vent and overflow pipe 84 a flexible tubular connection 96 leads to the top of a bell float member 100, the lower portion of which is submerged below the liquid level in the float box 66. The top of this float member 100 is also provided with an operating connection 102 with one arm of a beam 104 which is fulcrumed at 105 upon a fixed supporting arm 106 beneath the valve device 14. This arm of the beam 104 is also provided with an adjustable poise 108 and the other arm of the beam carries a counterbalancing weight 110 and is provided with a link connection 112 with the control arm 15 of said valve 14.

In the operation of the control devices as applied to flow control operation in gas feeding apparatus of the above described character, water is admitted to the float box and also to the bell jar 20, up to the levels indicated in the drawing, whereupon the supply of gas is admitted to the valve 14 (as by opening the valve 11 of the gas supply tube 12); and with the valve 73 in the water line 74 also open, the operation of the water-jet eductor device 72 will result in a vacuum action being produced through the connections to the rocker valve 50, and hence to the interior of the ball jar 20. The degree of vacuum thus produced in the bell jar will depend upon the relative extent of opening of the valves 14 and 50.

Preliminary manual adjustment and setting of the gas inlet valve 14 predetermines the limit of the working vacuum to be maintained in the bell jar 20; for as the vacuum action in the jar 20 approaches such predetermined limit, a differential pressure is developed (as indicated by the resulting irregular water level) due to the gas entering the jar 20 by way of the orifice 32 of the orifice bell 30, as a consequence of which said orifice bell will rise and thereby allow the control valve 50 to rock into a more nearly closed position. The bell member 30 in its lowermost position operates to maintain said valve 50 open, and the vertical movement of the bell member may be sufficient to entirely close said valve, following which a further rise of the bell member will result in its engaging the stop 54, thereby limiting the extent of its vertical upward movement.

As the operation proceeds, this actuation of the control valve 50 in response to fluctuations of said differential pressure in the bell jar or regulating chamber 20 will take place automatically, thereby tending to maintain a constant degree of vacuum within said chamber. This substantially constant vacuum action is in turn utilized for correspondingly controlling the gas inlet valve 14, by virtue of the pipe connection 84 and branch tube 96 through which said vacuum action is transmitted to the bell float member 100. Consequently the movements of the float member 100 will be in unison with those of the orifice bell 30, and so coordinated as to operate the valve 14 in a manner which will regulate the gas inflow and, in turn, the operation of the valve 50, so that a steady and uniform vacuum will be thereby maintained in the bell jar or regulating chamber 20.

The gas leaving the bell jar 20 flows through the orifice 48 and tube 46 into the bubble compartment 43, and on through the tube 56 and into the manometer structure where the water is separated from the gas, the latter flowing through the manometer tube 58 before rejoining the water; and thereafter the water and gas mixture flows on through the tube 64 and the connection 70 to the eductor device, and thence through the discharge outlet 75.

In the particular form of apparatus illustrated, since the normal flow of gas and water from the tube 64 is insufficient for satisfying the vacuum capacity of the eductor device, a supplementary water supply is drawn up from the float box 66 through the lower extension of the pipe 64, with a view to maintaining a substantially constant and approximately fixed vacuum in the gas outlet tube 46.

From the foregoing explanation of the general operation it will be clear that the primary objects of my invention are accomplished, as regards means for regulation and automatic control functions, in that the orifice bell member 30 in combination with the control valve 50 provide a most sensitive means, operating in response to the most minute changes in differential pressure, for effectually controlling the gas flow; and since the response of the orifice bell is instantaneous and non-pulsating as well as positive in action, this insures a high degree of uniformity, steadiness and accuracy in the maintenance of the necessary operative vacuum as required for the production of the gas flow, and incidentally, an operation which is especially suitable for manometer readings, as by means of a convenient scale 59.

Moreover, as a further control function, which may be either supplemental or adapted to be carried out entirely independent of the first control action, for the regulation of the valve 14 itself, this likewise is rendered directly responsive to any variation of the vacuum condition within the bell jar 20 and operates to effect proper adjustment of said valve 14 for the purpose of making just such corrections of the feeding rate as are indicated by the fluctuations being responded to, as will be readily understood.

Provision is made for safeguarding the foregoing operations against abnormal pressure conditions. For example, while the operation of the eductor device is not adapted to produce an excessive vacuum in the bell jar or chamber 20, an excessive suctional action from the gas supply line might be sufficient to pull water into the jar through the pipe 84 were it not for the provision of a connection from the float 86 to the vent cup 99 whereby any such excess vacuum would be at once broken. Likewise, any excess of positive gas pressure in said bell jar or chamber 20 would be vented out through said tube 84 to the vent bell 92 and outlet 94. Furthermore, the possibility of any excess water pressure occurring in said jar or chamber 20 is eliminated by the provision of the large overflow outlet 84.

It will therefore be apparent that I have devised an improved form of control mechanism which is adapted for various uses and applications in the control and regulation of mechanical functions of different types, including the class of apparatus herein illustrated, pertaining to the regulation of the flow of gases in gas feeding systems.

In this connection it may be particularly pointed out that the control features of the invention may be practised either concurrently or independently of each other. For example, the automatic control function through the medium of the bell float member 100 might be dispensed with; or the control by means of the orifice bell 30 and the control member 50 and their related parts might under some conditions be omitted, leaving the control function dependent upon the operation of the float member 100 and its connections.

Accordingly it is to be understood that the construction and arrangement of operative elements herein described is intended to be illustrative only, and that the same may be greatly varied and modified to conform to the varying requirements to be met by any particular application of the improvements. It is therefore my desire to expressly reserve the right to make all such formal changes as may fairly be deemed to fall within the spirit and scope of my invention as defined by the following claims.

What I claim is:

1. Control mechanism comprising means providing a regulating chamber having a gas intake and a gas outlet and also a liquid level therein below said intake and outlet, vacuum producing means communicating with said outlet, a control valve enclosed within said chamber in position for directly regulating the flow through said outlet, and float-actuated means comprising a float member operatively connected with said valve and enclosing said gas intake and responsive to changes in pressure in said chamber for correspondingly regulating said control valve.

2. Control mechanism comprising means providing a regulating chamber, having a gas intake and a gas outlet and also a liquid level therein below said intake and outlet, vacuum producing means communicating with said outlet, a control valve enclosed within said chamber in position for directly regulating the flow through said outlet, and an orifice bell member operatively connected with said valve and mounted in float relation to and enclosing said gas intake and responsive to fluctuations of the pressure in said chamber for correspondingly regulating said control valve.

3. Control mechanism comprising means providing a regulating chamber having a gas intake and a gas outlet and also a liquid level therein below said intake and outlet, vacuum producing means communicating with said gas outlet, a control valve enclosed within said chamber in position for directly regulating the flow through said outlet, a float member enclosing said gas intake and responsive to pressure changes in said chamber, and a mechanical operating connection between said float valve and said control member whereby the latter is directly actuated in accordance with the movements of said float valve.

ELMER E. HARPER.

REFERENCES CITED

The following references are of record in the file of this patent:

UNITED STATES PATENTS

| Number | Name | Date |
| --- | --- | --- |
| 2,137,204 | Booth | Nov. 15, 1938 |
| 2,158,976 | Booth | May 16, 1939 |
| 2,158,985 | Peet | May 16, 1939 |
| 2,300,642 | Booth | Nov. 3, 1942 |
| 2,391,060 | MacKay | Dec. 18, 1945 |
| 2,459,700 | Harper | Jan. 18, 1949 |
| 2,469,230 | Harper | May 3, 1949 |